(12) United States Patent
Hong et al.

(10) Patent No.: US 8,798,165 B2
(45) Date of Patent: Aug. 5, 2014

(54) TECHNIQUES FOR PREDICTION OF UNAVAILABLE SAMPLES IN INTER-LAYER PREDICTED VIDEO CODING

(71) Applicant: Vidyo, Inc., Hackensack, NJ (US)

(72) Inventors: Danny Hong, New York, NY (US); Jill Boyce, Manalapan, NJ (US)

(73) Assignee: Vidyo, Inc., Hackensack, NJ (US)

( * ) Notice: Subject to any disclaimer, the term of this patent is extended or adjusted under 35 U.S.C. 154(b) by 0 days.

(21) Appl. No.: 14/147,909

(22) Filed: Jan. 6, 2014

(65) Prior Publication Data

US 2014/0192887 A1   Jul. 10, 2014

Related U.S. Application Data

(60) Provisional application No. 61/749,013, filed on Jan. 4, 2013.

(51) Int. Cl.
*H04N 7/18* (2006.01)

(52) U.S. Cl.
USPC ............. 375/240.25; 375/240.12; 375/240.29

(58) Field of Classification Search
USPC ............................ 375/240.12, 240.25, 240.29
See application file for complete search history.

(56) References Cited

U.S. PATENT DOCUMENTS

| 2007/0116131 | A1* | 5/2007 | Sun ........................ 375/240.29 |
| 2009/0010331 | A1 | 1/2009 | Jeon et al. |
| 2011/0235714 | A1 | 9/2011 | Park et al. |
| 2012/0183077 | A1* | 7/2012 | Hong et al. ............. 375/240.25 |

FOREIGN PATENT DOCUMENTS

WO   WO 2006/058921   6/2006

OTHER PUBLICATIONS

International Search Report and Written Opinion for PCT/US2014/010302, dated May 7, 2014.

* cited by examiner

*Primary Examiner* — Sath V Perungavoor
*Assistant Examiner* — Jeffery Williams
(74) *Attorney, Agent, or Firm* — Baker Botts L.L.P.

(57) ABSTRACT

Disclosed herein are video coding techniques for prediction of a to-be-reconstructed block from enhancement layer/view data from base layer/view data in conjunction with enhancement layer/view data, where samples that are not available in the base or enhancement layer/view, respectively, are being predicted through padding.

24 Claims, 6 Drawing Sheets

Not to scale

TECHNIQUES FOR PREDICTION OF UNAVAILABLE SAMPLES IN INTER-LAYER PREDICTED VIDEO CODING

PRIORITY AND RELATED APPLICATION

This application claims priority to U.S. Ser. No. 61/749,013, filed Jan. 4, 2013, the disclosure of which is hereby incorporated by reference in its entirety.

FIELD

The present application relates to video coding techniques for prediction of a to-be-reconstructed block from enhancement layer/view data from base layer/view data in conjunction with enhancement layer/view data, where samples that are not available in the base or enhancement layer/view, respectively, are being predicted through padding.

BACKGROUND

Video compression using scalable techniques in the sense used herein allows a digital video signal to be represented in the form of multiple layers and/or in multiple views for multiview environments such as stereoscopic view environments. Scalable video coding techniques have been proposed and/or standardized since at least 1993.

In the following, an enhancement layer and a reference layer are distinguished. Information from the reference layer, be it reconstructed samples or meta information such as block coding modes or motion vectors, can be used for prediction of the enhancement layer through inter-layer prediction. The base layer is a special case of a reference layer in that it does not itself have another reference layer from which it is inter-layer predicted. Herein, the term "layer" can interchangeably be used with "view" (in multiview coding) or "depth map". Therefore, there are reference views, enhancement views, and so on. Henceforth, only layers are described; however the disclosed subject matter can equally apply to views, depth maps, and similar structures.

ITU-T Rec. H.262, entitled "Information technology—Generic coding of moving pictures and associated audio information: Video", version February/2000, (available from International Telecommunication Union (ITU), Place des Nations, 1211 Geneva 20, Switzerland, and incorporated herein by reference in its entirety), also known as MPEG-2, for example, includes in some of its profiles a scalable coding technique that allows the coding of one base and one or more enhancement layers. The enhancement layers can enhance the base layer in terms of temporal resolution such as increased frame rate (temporal scalability), spatial resolution (spatial scalability), or quality at a given frame rate and resolution (quality scalability, also known as SNR scalability).

ITU Rec. H.263 version 2 (1998) and later (available from International Telecommunication Union (ITU), Place des Nations, 1211 Geneva 20, Switzerland, and incorporated herein by reference in their entirety) also includes scalability mechanisms allowing temporal, spatial, and SNR scalability. Specifically, an SNR enhancement layer according to H.263 Annex O is a representation of what H.263 calls the "coding error", which is calculated between the reconstructed image of the base layer and the source image. An H.263 spatial enhancement layer can be decoded from similar information, except that the base layer reconstructed image has been upsampled before calculating the coding error, using an interpolation filter. In case of SNR scalability, H.263 Annex O requires that the base layer picture and the enhancement layer picture have exactly the same dimension measured in samples. For spatial scalability, H.263 Annex O requires that the resolution of the enhancement layer is exactly a factor of two of the base layer in each dimension. No provision for disparate picture sizes in (upsampled in case of spatial scalability) base and enhancement layers pictures have been specified, and H.263 requires that picture sizes of reference layer and enhancement layer have to be identical for SNR scalability, or a factor of two in each dimension for spatial scalability.

ITU-T Rec. H.264 version 2 (2005) and later (available from International Telecommunication Union (ITU), Place des Nations, 1211 Geneva 20, Switzerland, and incorporated herein by reference in their entirety), and their respective ISO-IEC counterpart ISO/IEC 14496 Part 10 include scalability mechanisms known as Scalable Video Coding or SVC, in their respective Annex G. Again, the scalability mechanisms of H.264 and Annex G include temporal, spatial, and SNR scalability (among others such as medium granularity scalability). From version 4 (2009) onwards, ITU-T Rec. H.264 (and its ISO/IEC counterpart) also include annex H entitled "Multiview Video Coding" (MVC). According to MVC, a video bitstream can include multiple "views". One view of a coded bitstream can be a coded representation of a video signal representing the same scene as other views in the same coded bitstream. Views can be predicted from each other. In MVC, one or more reference views can be used to code another view. MVC uses multi-loop decoding. During decoding, the reference view(s) are first decoded, and then included in reference picture buffer and assigned values in the reference picture list when decoding the current view.

Figure 1:
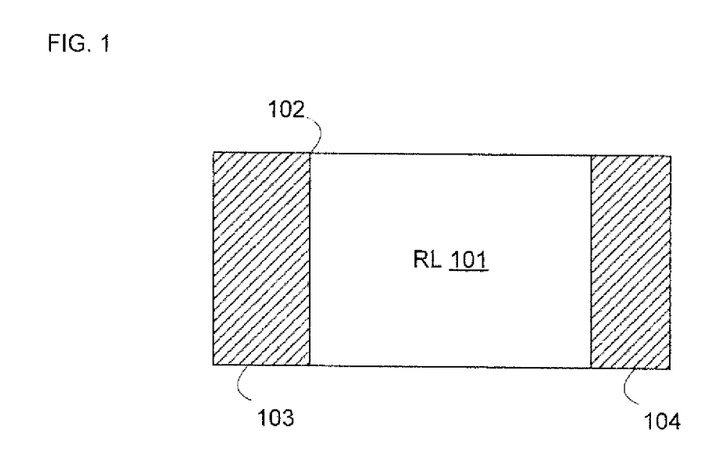
FIG. 1 is a schematic illustration of a base layer picture used for inter-layer SNR prediction of an enhancement layer picture in accordance with Prior Art.

In SVC, in contrast to H.263 Annex O, it is possible that a given to-be-reconstructed enhancement layer sample does not have a corresponding base layer sample from which it can be predicted. Referring to FIG. 1, one (of many) examples where this situation can occur is when, using SNR scalability, a reference layer in 4:3 format (101) is augmented by an enhancement layer in 16:9 format (102). The side bars (103) (104) of the 16:9 picture lack base layer information from which they can be predicted. Note that the use of SNR scalability and 16:9 vs. 4:3 picture sizes are but one example of where the disclosed subject matter may be applicable.

For each region in the to-be-reconstructed enhancement layer (EL) picture, if a corresponding region exists in the reference layer (RL) picture, then the coded information of the RL is used to differentially code the EL layer information. A region in the sense used above can be a single sample of the given layer, or multiple samples of the layer.

In H.264 SVC intra coding of the EL, the RL's decoded samples can be used to derive residual samples in the EL. In another example, the RL's motion information can be used to differentially code the motion information of the EL. In another example, the RL's intra prediction direction can be used when coding the intra prediction direction of the EL.

If the corresponding RL information, i.e., decoded samples, coding mode, intra prediction direction, and motion vectors, is not available, inter-layer prediction is usually disabled as described below in more detail. The term "available" refers to a corresponding sample not being part of the reference layer picture. Referring to FIG. 1, the samples that constitute the sidebars (103) (104) are not available in this sense.

As a result, a standard compliant SVC encoder and decoder checks the availability of the corresponding RL information for each region in the EL, and utilize specialized handling of non-available RL information as described below.

Figure 2:
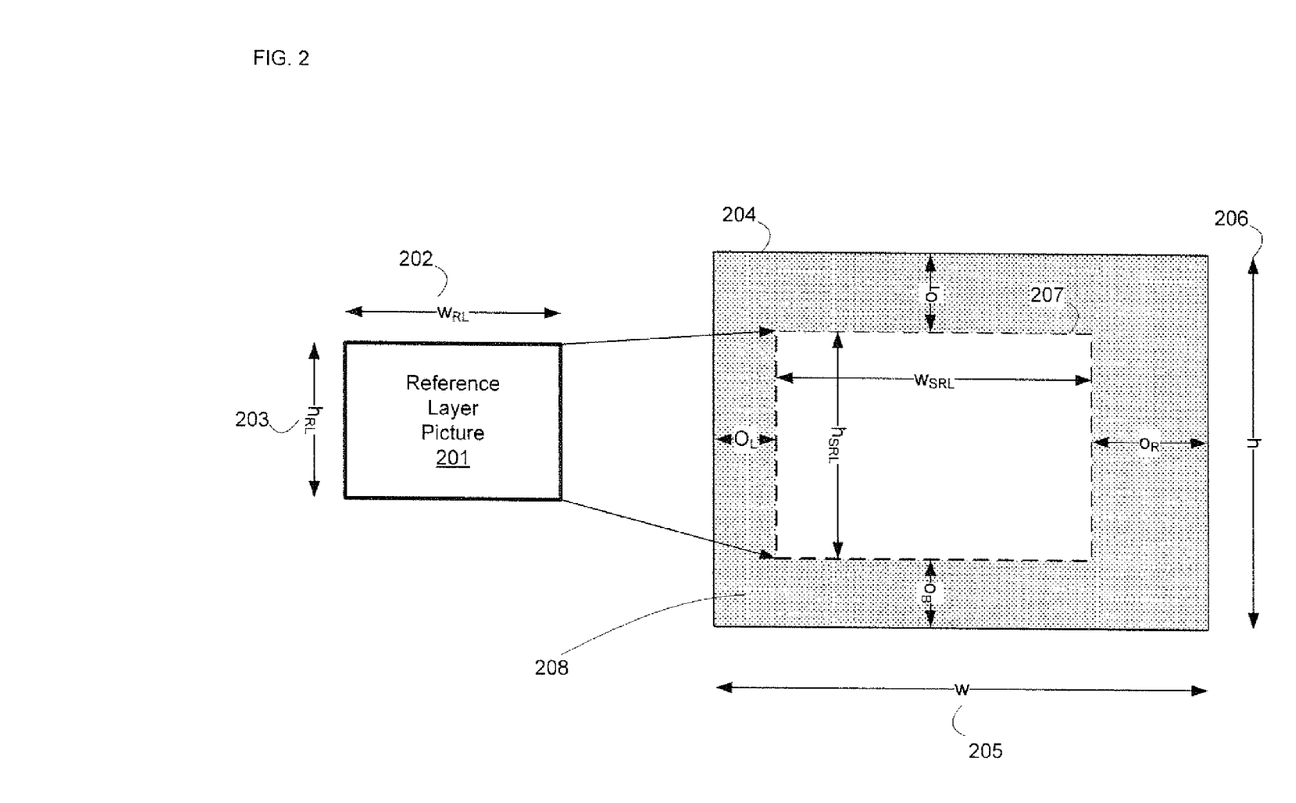
FIG. 2 is a schematic illustration of a base layer picture used for inter-layer spatial prediction of an enhancement layer picture in accordance with Prior Art.

In SVC, the enhancement layer (EL) region that corresponds to the coded reference layer (RL) picture is defined as a scaled RL picture region. FIG. 2 shows another example. A reference layer picture (201) has a horizontal size of $W_{RL}$ (202) samples, and a vertical size of $H_{RL}$ (203) samples. This reference layer is used for inter layer prediction to an enhancement layer picture (204) using spatial scalability. The EL picture has horizontal and vertical dimensions of w (205) and h (206) samples, respectively. Note that there may, or may not, be any relationship between w and $W_{RL}$, and h and $H_{RL}$, respectively.

Inter-layer prediction might be performed only on a part of the samples of the EL picture, specifically of inner rectangle (207) with dimensions $w_{SRL}$ and $h_{SRL}$. The regions (208) of the EL picture outside of this rectangle (207) but inside the enhancement layer picture (204), are regions (208) of samples that are not available. In SVC, the EL picture and the scaled RL picture's dimensions can be derived as $w_{SRL} \times h_{SRL}$ with $wSRL=w-o_L-o_R$ and $h_{SRL}=h-o_T-o_B$, where the values of the offsets ($o_L$, $o_R$, $o_T$, and $o_B$) can be specified in the enhancement layer bitstream. The offsets are shown as having positive values, and in this case, not all regions of the EL picture have corresponding RL information: the clear region (207) correspond to the scaled RL picture and (only) this region of the EL picture have corresponding RL information and can be coded using inter-layer prediction. The shaded region (208) in the EL picture that lies outside of the clear region does not have corresponding RL information, and hence, cannot be coded using inter-layer prediction. When the offsets are all zero, then the entire EL picture corresponds to the entire coded RL picture. When the offsets are negative, then the entire EL picture corresponds to a sub-region within the RL picture.

Once the scaled $R_L$ picture's dimensions are derived, the scale factor for width can be defined as $s_W=w_{SRL}/w_{RL}$, where $w_{RL}$ is the width of the RL picture. Similarly, the scale factor for height is defined as $s_H=h_{SRL}/h_{RL}$, where $h_{RL}$ is the height of the RL picture. Then, given the EL picture's sample position (x, y), the corresponding sample position in the RL picture is defined as ($x_{RL}$, $y_{RL}$), where $x_{RL}=(x-o_L)/s_W$ and $y_{RL}=(y-o_T)/s_H$.

Figure 3:
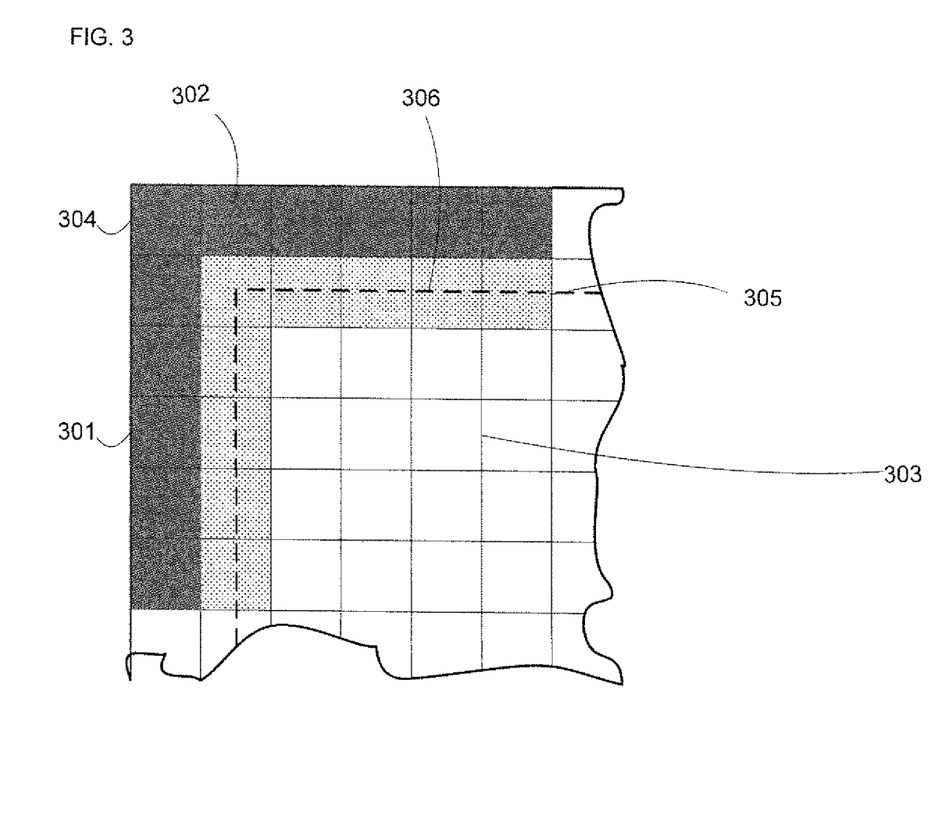
FIG. 3 is a schematic illustration of a (partial) base layer picture used for inter-layer spatial prediction of an enhancement layer picture in accordance with Prior Art.

In SVC, each picture is coded in 16×16 sample blocks called Macroblocks (MBs). Each MB of the EL picture can be optionally coded utilizing inter-layer prediction if and only if there exists corresponding RL information corresponding to all samples of the EL MB. FIG. 3 shows the top left part of an EL picture (301) subdivided into a raster of MBs (302). Clear region (303) of the EL picture shows the scaled RL picture region that corresponds to the coded RL picture. Dark shaded region (304) shows those EL picture macroblocks not covered at all by the upsampled base layer picture, and, therefore, not using inter layer prediction. The medium shaded macroblocks (305) cover the outer edge of the (upsampled) RL picture, depicted here by a dashed line.

Only the MBs (303) depicted in clear that are entirely within the dotted region can be coded with inter-layer prediction. Note that the information of the MBs (305) that partially reside in region of the (upsampled) RL picture, but partly outside of that picture (as indicated by the bordering line of the upsampled RL picture (306)) cannot use inter-layer prediction. In other words, the decision of whether, for example, sample data of the RL picture can be used for inter layer prediction can be done on an (EL) macroblock granularity.

The restrictions described above are specified in SVC by an algorithm known as the "InCropWindow( ) process". It checks for each EL MB whether the MB is entirely within the scaled RL picture region that has corresponding RL information. Given the MB's top-left sample position ($x_{MB}$, $y_{MB}$), the process checks whether the following are all true: $x_{MB} \geq \text{Floor}[(o_L+15)/16]$, $x_{MB} < \text{Floor}[(o_L+w_{SRL})/16]$, $y_{MB} \geq \text{Floor}[(o_T+15)/16]$, and $y_{MB} < \text{Floor}[(o_T+h_{SRL})/16]$. The options for applying any inter-layer predictions are included in the enhancement layer bitstream only for the MBs that lie entirely within the scaled RL picture region because other MBs are prohibited from using inter-layer prediction. In that case, some syntax elements are not present in the coded enhancement layer bitstream, including base_mode_flag, residual_prediction_flag, and motion_prediction_flag. Consequently, the "InCropWindow( ) process" is executed for each MB in order to decide whether inter-layer prediction related signals need to be parsed.

SVC's mechanisms that address disparate RL and EL picture sizes, as described above, require not only the invocation of a complex process like the InCropWindow process frequently, i.e. on a per macroblock basis. Parsing of the macroblock syntax is conditional based upon this process. Also, certain samples may not benefit from inter-layer prediction even if relevant reference layer samples are available, as the decision for availability is made at macroblock granularity.

It would be advantageous if the aforementioned shortcomings could be avoided.

SUMMARY

The disclosed subject matter provides techniques for prediction of a to-be-reconstructed block from enhancement layer/view data. Samples or meta data such as motion vectors that are not available in the base or enhancement layer/view, respectively, are being predicted through padding, so to enable inter-layer prediction.

In one embodiment, techniques are disclosed for inter layer prediction in which information used for inter layer prediction of a region for which no reference layer information is available is predicted from a neighboring reference layer region.

In the same or another embodiment, the inference is implemented through padding.

In the same or another embodiment, only certain forms of information, such as motion vector information, block type information, or the like, are inferred whereas other types of information are taken from the reference layer picture.

BRIEF DESCRIPTION OF THE DRAWINGS

Further features, the nature, and various advantages of the disclosed subject matter will be more apparent from the following detailed description and the accompanying drawings in which.

The Figures are incorporated and constitute part of this disclosure. Throughout the Figures the same reference numerals and characters, unless otherwise stated, are used to denote like features, elements, components or portions of the illustrated embodiments. Moreover, while the disclosed subject matter will now be described in detail with reference to the Figures, it is done so in connection with the illustrative embodiments.

DETAILED DESCRIPTION

Throughout the description of the disclosed subject matter the term "reference layer" or RL refers to the layer (or view) in the layer hierarchy (or multiview hierarchy) on which the enhancement layer (or view) (EL) is based on. In environments with more than two enhancement layers or views, the reference layer or reference view, as used in this description, does not need to be the lowest possible (base) layer or view.

In SVC, the EL syntax follows the same core design principles as the BL syntax, namely those specified in H.264. ITU-T Rec. H.265, entitled High Efficiency Video Coding, version April/2013, (available from International Telecommunication Union (ITU), Place des Nations, 1211 Geneva 20, Switzerland, and incorporated herein by reference in its entirety), is referred herein as HEVC. HEVC may be enhanced by a scalable extension known as SHVC (see JCT-VC-O1008, available from http://phenix.it-sudparis.eu/jct/doc_end_user/current_document.php?id=8527, incorporated by reference herein in its entirety.) SHVC, in contrast to SVC, may introduce multistandard scalability where, for example, the RL can be coded in H.264 and the EL in SHVC. Aspects of this multistandard scalability have been disclosed, for example, in U.S. patent application Ser. No. 13/528,010, entitled "Scalable Video Coding Using Multiple Coding Technologies", which is incorporated herein by reference in its entirety. At least in the multistandard case, but also in some SHVC implementations, the EL encoder or decoder may have access only to the RL's encoder or decoder's decoded sample information; meta information such as motion vectors, coding modes, and so on, may or may not be available, depending on the similarities of the base and enhancement layer coding technologies and the architecture of the scalable or multistandard encoder or decoder. For example, if the base layer coding technology does not support motion compensation, obviously there cannot be motion vector data available for inter-layer prediction. As another example, an SHVC decoder may decode only an SHVC enhancement layer (or a set of enhancement layers), while receiving only the reconstructed samples of the base layer (which is HEVC compliant) from an legacy HEVC decoder via an SDI video link.

Moreover, not even all BL sample information might be available for inter layer prediction. For example, many video coding technologies allow their output to be cropped (picture cropping is described later). Assuming an H.264 base layer, the output of the RL codec can be a cropped picture configured for display (if cropping information is present in the sequence parameter set—SPS), rather than the entire reconstructed coded picture.

Such a scenario is shown in FIG. 2. Rather than allowing all samples of the BL reconstructed picture (201) to be used for inter-layer prediction, only the information inside the cropping window (202) may be available for interlayer prediction, reducing the region of samples in the EL layer picture that can benefit from inter layer prediction. It should be noted that the cropping window has been depicted very small for clarity. In certain scenarios, the cropping window covers a large percentage of the coded picture. However, a small cropping window as shown is permitted in SVC and HEVC/SHVC.

Figure 4:
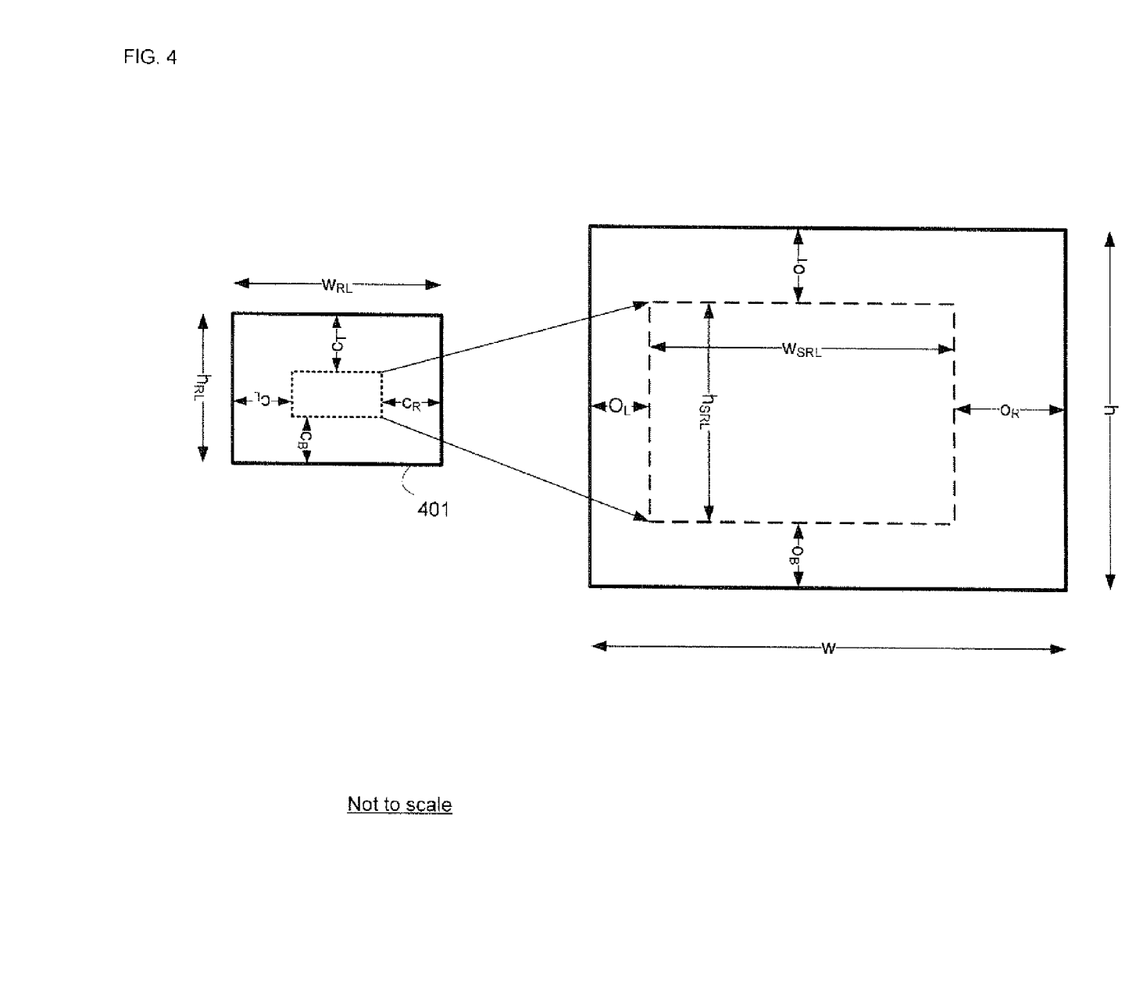
FIG. 4 is a schematic illustration of a reconstructed base layer picture involving a cropping window used for inter-layer spatial prediction of an enhancement layer picture in accordance with an embodiment of the present disclosure.

Referring to FIG. 4, if the same EL codec is used for both the EL and the RL, or the EL codec has access to the RL codec's meta data and similar information, then the display/output RL picture can be derived using the cropping information ($c_L$, $c_R$, $c_T$, and $c_B$) (all of which are depicted inside the RL picture (401)) and its dimensions are derived as $w'_{RL} \times h'_{RL}$ with $w'_{RL} = w_{RL} - c_L - c_R$ and $h'_{RL} = h_{RL} - c_T - c_B$. This case is henceforth referred to as the "Full RL Access" case. In this case the scale factor for width can be $s_W = w_{SRL}/w'_{RL}$, and the scale factor for height can be $s_H = h_{SRL}/h'_{RL}$. Given the EL picture's sample position (x, y), the corresponding sample position in the RL can be described as ($x_{RL}$, $y_{RL}$), where $x_{RL} = [(x - o_L)/s_W] - c_L$ and $h_{RL} = [(y - o_T)/s_H] - c_T$.

If the cropping information is not present or the EL codec only has an access to the output samples of the RL codec (without access to metadata such as the cropping window information), then the output can be assumed to be in dimensions that already accounted for cropping information. This case is referred to as the "Limited RL Access" case, and in this case, all cropping values ($c_L$, $c_R$, $c_T$, and $c_B$) can be assumed to be zero.

In one embodiment, so to overcome the shortcomings described above in SVC's inter-layer prediction, particularly with respect to the availability of region data for inter layer prediction, when forming inter layer reference predictions for EL regions with corresponding positions in the RL that lie outside of the RL picture dimensions can infer the corresponding RL information from the closest available RL region. Inferred RL information can include RL sample values and metadata such as motion vectors, coding modes, and so on. Examples of possible inference mechanisms are described below. Doing so can have a number of advantages.

First, according to the same or another embodiment, the availability of information for inter layer prediction can be moved from macroblock granularity, as described already above for the case of SVC, to sample granularity. Accordingly, in certain cases, a larger percentage of samples can benefit from the increased coding efficiency associated with inter layer prediction. (Referring to FIG. 3, in SVC, an EL macroblock has corresponding RL samples for all its EL samples so to allow those RL samples to be used for prediction.) According to the same or another embodiment, all samples that are available for inter layer prediction in the RL (in contrast to only the samples that correspond to full EL MBs) can be used for inter layer prediction.

Figure 5:
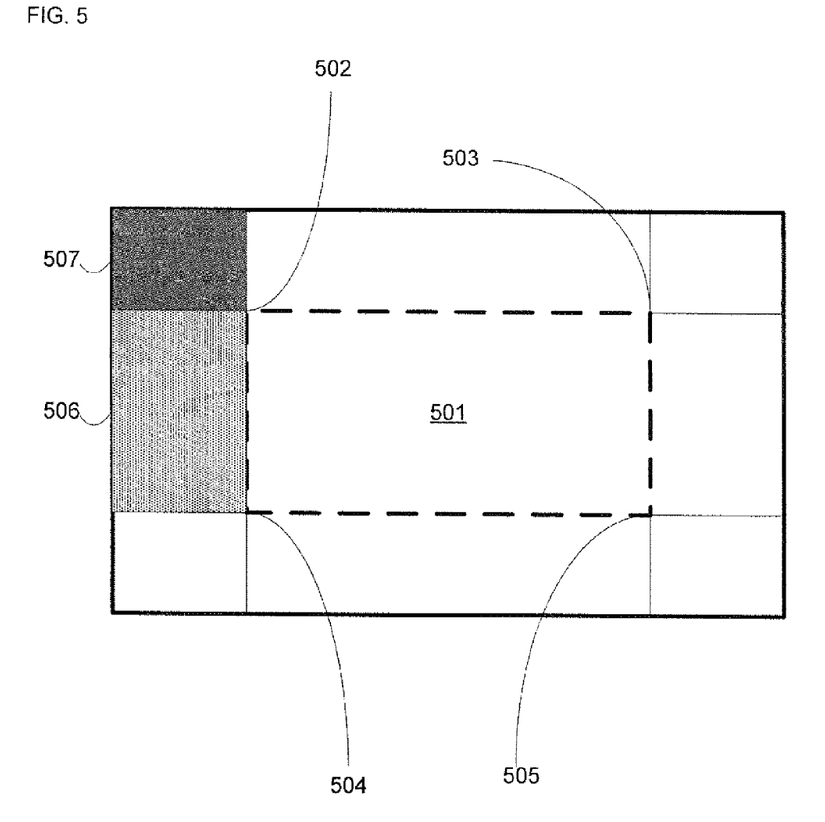
FIG. 5 is a schematic illustration of a reconstructed enhancement layer picture in accordance with an embodiment of the present disclosure.

In the same or another embodiment, the inference mechanism can operate as follows. Referring to FIG. 5, assume the (scaled) RL picture, depicted as clear region (501) has its top-left most sample in (x0, y0) (502), top-right most sample in (x1, y0) (503), left-bottom most sample in (x0, y1) (504), and right-bottom most sample in (x1, y1) (505). For the purpose of inter layer prediction, samples that are above (x, y0) (have y coordinates smaller than y0) can infer the same RL information for inter-layer predication as the sample in (x, y0), for x=x0 . . . x1. Again, "information" can include sample values but also meta information such as motion vectors, intra prediction modes, coding modes, and so forth. Samples that are left of (x0, y) (have x coordinates smaller than x0) and are within y0 and y1 for the vertical dimension can infer the same RL information for inter-layer prediction as the sample in (x0, y), for y y0 . . . y1. Those samples are depicted in the shaded region (506). Similarly, samples below (x, y1) for x=x0 . . . x1, and samples right of (x1, y) for y=y0 . . . y1 can infer information following the same logic. For the corners, samples that are above and right of (x0, y0) (shown here in a different shading (507) can infer the same RL information for inter-layer prediction as the sample in (x0, y0), and a similar rule can be followed for the other corners.

SHVC allows for spatial scalability. When spatial scalability is in use, EL and RL resolutions can be different.

When the EL and RL are of different resolutions, multiple tap filters can advantageously be used for upsampling the samples of reconstructed RL pictures prior to their use for inter layer prediction. Similarly, some meta information may also be unsealed. For example, motion vectors can be unsealed. For other meta information, such as coding modes and intra prediction, upscaling is not necessarily as intuitive as it is for motion vectors, but may also be performed. U.S. patent application Ser. No. 13/529,159, filed Jun. 21, 2012, and entitled "Scalable Video Coding Techniques," incorporated by reference in its entirety, describes some possible mechanisms for upscaling.

The RL sample corresponding to the EL sample currently under reconstruction and its spatial neighbors can be used as inputs of an upsampling filter. One or more of these samples may also be unavailable. The unavailable corresponding tL sample and/or its spatial neighbour samples in the RL used for upsampling filter inputs can be inferred from the nearest RL samples within the picture dimensions in a similar fashion as already described for the non-upscaled BL case.

The inference mechanism described above has some similarities with an implementation strategy which is sometimes used for motion compensation and known as "padding". In at least some single layer encoder or decoder implementations, sample values on the edge of a picture are being copied to regions outside the picture dimensions using a similar approach as described above so to facilitate motion vector search or sample reconstruction. By having those sample values available outside the picture dimensions, motion vectors can sometimes be calculated without conditional operations, which in some architectures can disrupt pipeline operations and are, therefore, computationally expensive. However, those padding-utilizing encoders/decoders do not normally store or process meta information, nor are padded sample values in the aforementioned sense normally used for inter-layer prediction (as the encoders/decoders may be single layer capable only).

The described approach eliminates the need for "InCropWindow( ) process" type of checking of availability conditions for all Coding Units (or MBs), which has great benefits for computational complexity, as it eliminates conditional execution, and therefore can be friendly to parallel architectures and to implementations using deep pipelines. Further, samples of all Coding Units (CUs) can utilize inter-layer prediction, i.e., for differential coding of any of decoded pixels, coding mode, intra prediction direction, and motion vectors, that would, in accordance with SVC, not be available due to the macroblock granularity of the "InCropWindow( ) process".

In the same or another embodiment, the decoding process may need to address that, for Coding Units in areas without a corresponding RL, the unavailable RL information can be extended from the closest available RL region, following, for example, the above mentioned padding mechanism. One option to implement it, assuming the "Limited RL Access" case, to extend the RL information beyond its picture dimensions so that the scaled version of the extended resolution matches the EL resolution. In doing so, EL CUs can have corresponding RL information available. For the "Full RL Access" case, the cropped RL information can first be obtained using the cropping information, then the cropped information can be extended as in the "Limited RL Access" case.

In the same or another embodiment, the coding efficiency of inter-layer prediction can be improved in such cases where only parts of the corresponding RL meta data is available and other parts are not. For example, for inter-layer motion prediction, if the corresponding RL's region is intra coded, there may be no motion vector available from the corresponding RL region for use in differentially coding the EL's motion vector. However, information of that type (in this example: motion vectors) may be available in regions spatially close to the region which does not have that type of meta data available. Accordingly, the mechanism described above can be applied to infer (potentially only) the missing parts of the meta data used for inter layer prediction from the closest region that has that information available. For the example mentioned (missing motion vector information), the neighboring inter-coded blocks' information including their motion vectors in the RL can be extended to the current area. Because more than one neighbour may be available in the RL, more generally, a weighted average of the closely available RL's information can be used.

Second, another benefit is that a simplified parsing and decoding of inter-layer prediction signals can be applied for all coding regions (e.g., macroblocks in H.264/SVC and Coding Units in HEVC). No mechanism that checks the availability of the reference layer (RL) information such as "InCropWindow( ) process" is needed. Any syntax elements used for conveying inter-layer prediction can be present for all Coding Units, and not conditionally present based upon the availability of the corresponding RL region as is done in SVC. This can greatly facilitate parallel processing.

Third, another benefit of the disclosed subject matter is that the EL regions that do not have corresponding RL region or only partially have corresponding RL region can further benefit by utilizing inter-layer prediction. For example, for a Coding Unit in which high but lower than 100% percentage of its area which has an available corresponding RL, there could potentially be a coding efficiency benefit from using inter-layer prediction. This can be partially reduced by the bitrate cost of including inter-layer prediction signals in the bitstream for even those areas that do not have corresponding RL region available. This overhead in bits can be made minimal with a well-designed context-based arithmetic coding.

The methods for inter layer prediction, described above, can be implemented as computer software using computer-readable instructions and physically stored in computer-readable medium. The computer software can be encoded using any suitable computer languages. The software instructions can be executed on various types of computers. For example, FIG. 6 illustrates a computer system 600 suitable for implementing embodiments of the present disclosure.

Figure 6:
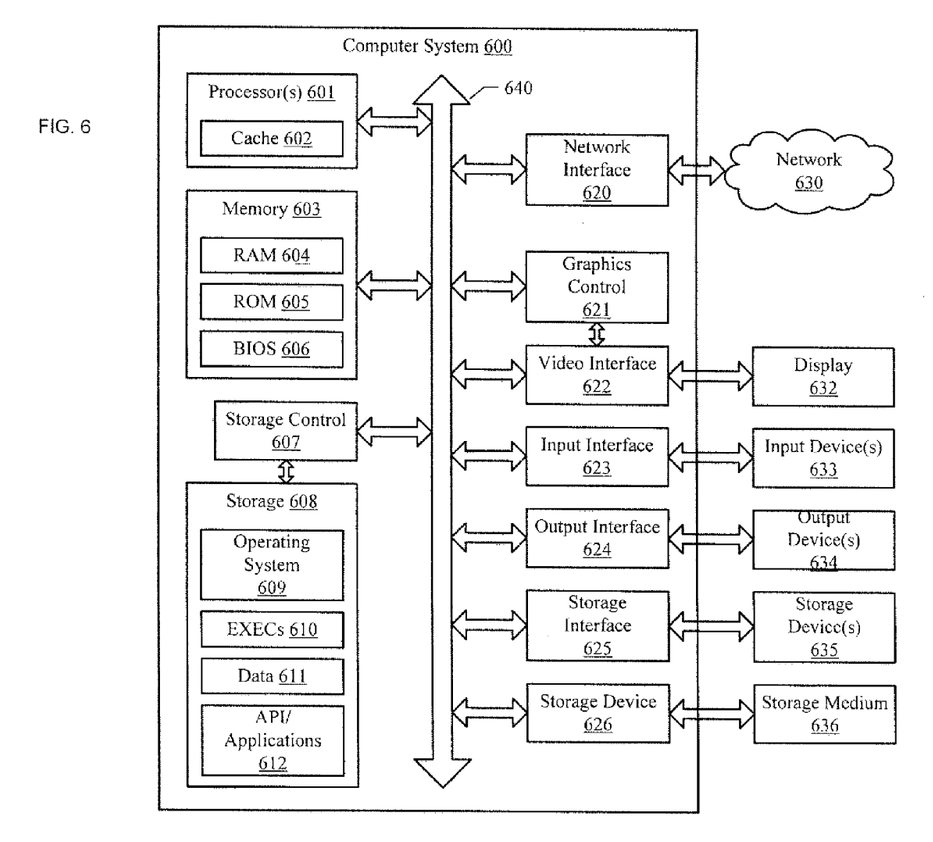
FIG. 6 shows an exemplary computer system in accordance with an embodiment of the present disclosure.

The components shown in FIG. 6 for computer system 600 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system. Computer system 600 can have many physical forms including an integrated circuit, a printed circuit board, a small handheld device (such as a mobile telephone or PDA), a personal computer or a super computer.

Computer system 600 includes a display 632, one or more input devices 633 (e.g., keypad, keyboard, mouse, stylus, etc.), one or more output devices 634 (e.g., speaker), one or more storage devices 635, various types of storage medium 636.

The system bus 640 link a wide variety of subsystems. As understood by those skilled in the art, a "bus" refers to a plurality of digital signal lines serving a common function. The system bus 640 can be any of several types of bus structures including a memory bus, a peripheral bus, and a local bus using any of a variety of bus architectures. By way of example and not limitation, such architectures include the Industry Standard Architecture (ISA) bus, Enhanced ISA (EISA) bus, the Micro Channel Architecture (MCA) bus, the Video Electronics Standards Association local (VLB) bus, the Peripheral Component Interconnect (PCI) bus, the PCI-Express bus (PCI-X), and the Accelerated Graphics Port (AGP) bus.

Processor(s) 601 (also referred to as central processing units, or CPUs) optionally contain a cache memory unit 602 for temporary local storage of instructions, data, or computer addresses. Processor(s) 601 are coupled to storage devices including memory 603. Memory 603 includes random access memory (RAM) 604 and read-only memory (ROM) 605. As is well known in the art, ROM 605 acts to transfer data and instructions uni-directionally to the processor(s) 601, and RAM 604 is used typically to transfer data and instructions in a bi-directional manner. Both of these types of memories can include any suitable of the computer-readable media described below.

A fixed storage 608 is also coupled bi-directionally to the processor(s) 601, optionally via a storage control unit 607. It provides additional data storage capacity and can also include any of the computer-readable media described below. Storage 608 can be used to store operating system 609, EXECs 610, application programs 612, data 611 and the like and is typically a secondary storage medium (such as a hard disk) that is slower than primary storage. It should be appreciated that the information retained within storage 608, can, in appropriate cases, be incorporated in standard fashion as virtual memory in memory 603.

Processor(s) 601 is also coupled to a variety of interfaces such as graphics control 621, video interface 622, input interface 623, output interface 624, storage interface 625, and these interfaces in turn are coupled to the appropriate devices. In general, an input/output device can be any of: video displays, track balls, mice, keyboards, microphones, touch-sensitive displays, transducer card readers, magnetic or paper tape readers, tablets, styluses, voice or handwriting recognizers, biometrics readers, or other computers. Processor(s) 601 can be coupled to another computer or telecommunications network 630 using network interface 620. With such a network interface 620, it is contemplated that the CPU 601 might receive information from the network 630, or might output information to the network in the course of performing the above-described method. Furthermore, method embodiments of the present disclosure can execute solely upon CPU 601 or can execute over a network 630 such as the Internet in conjunction with a remote CPU 601 that shares a portion of the processing.

According to various embodiments, when in a network environment, i.e., when computer system 600 is connected to network 630, computer system 600 can communicate with other devices that are also connected to network 630. Communications can be sent to and from computer system 600 via network interface 620. For example, incoming communications, such as a request or a response from another device, in the form of one or more packets, can be received from network 630 at network interface 620 and stored in selected sections in memory 603 for processing. Outgoing communications, such as a request or a response to another device, again in the form of one or more packets, can also be stored in selected sections in memory 603 and sent out to network 630 at network interface 620. Processor(s) 601 can access these communication packets stored in memory 603 for processing.

In addition, embodiments of the present disclosure further relate to computer storage products with a computer-readable medium that have computer code thereon for performing various computer-implemented operations. The media and computer code can be those specially designed and constructed for the purposes of the present disclosure, or they can be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter. Those skilled in the art should also understand that term "computer readable media" as used in connection with the presently disclosed subject matter does not encompass transmission media, carrier waves, or other transitory signals.

As an example and not by way of limitation, the computer system having architecture 600 can provide functionality as a result of processor(s) 601 executing software embodied in one or more tangible, computer-readable media, such as memory 603. The software implementing various embodiments of the present disclosure can be stored in memory 603 and executed by processor(s) 601. A computer-readable medium can include one or more memory devices, according to particular needs. Memory 603 can read the software from one or more other computer-readable media, such as mass storage device(s) 635 or from one or more other sources via communication interface. The software can cause processor(s) 601 to execute particular processes or particular parts of particular processes described herein, including defining data structures stored in memory 603 and modifying such data structures according to the processes defined by the software. In addition or as an alternative, the computer system can provide functionality as a result of logic hardwired or otherwise embodied in a circuit, which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

We claim:

1. A method for video decoding, comprising:
   decoding a first picture of a reference layer including first header information pertaining to the first picture, wherein the first header information comprises dimensions of the first picture;
   decoding second header information of a second picture of an enhancement layer or view, wherein the second header information comprises the dimensions of the second picture;
   decoding at least one offset indicative of the relative position of at least one sample of the second picture relative to its reference sample position in the first picture;
   determining a sample location in the first picture using at least two of the first picture's dimensions, the second picture's dimensions, and at least one of the at least one offsets;
   identifying at least one unavailable sample position in the first picture for which the corresponding sample location for the second picture is not within the first picture's picture dimensions;
   inferring at least one property of the sample in the at least one unavailable sample position; and
   decoding the second picture utilizing the at least one property of the sample in the at least one unavailable sample position for inter-layer prediction.

2. The method of claim 1, wherein the header information of a picture of an enhancement layer or view comprises the dimensions of a cropping window.

3. The method of claim 1, wherein the inferring comprises padding of at least one property of a sample.

4. The method of claim 3, wherein the at least one property comprises a sample value.

5. The method of claim 3, wherein the at least one property comprises a motion vector.

6. The method of claim 3, wherein the at least one property comprises a coding mode.

7. The method of claim 3, wherein the at least one property comprises an intra prediction mode comprising an intra direction.

8. The method of claim 3, wherein the inferring involves a weighted average of at least two values of motion vectors.

9. The method of claim 3, wherein the inferring involves a weighted average of at least two values of intra prediction directions.

10. The method of claim 3, wherein the padding comprises copying of the at least one property from a sample of the first picture closest to the unavailable sample position in the first picture into the unavailable sample position.

11. The method of claim 1, wherein the inferring comprises obtaining at least one property of an unavailable sample in the first picture from sample position of an available sample closest to the unavailable sample.

12. The method of claim 11, wherein the at least one property comprises a sample value.

13. The method of claim 11, wherein the at least one property comprises a motion vector.

14. The method of claim 11, wherein the at least one property comprises a coding mode.

15. The method of claim 11, wherein the at least one property comprises an intra prediction mode comprising an intra direction.

16. The method of claim 11, wherein the inferring involves a weighted average of at least two values of motion vectors.

17. The method of claim 11, wherein the inferring involves a weighted average of at least two values of intra prediction directions.

18. The method of claim 1, further comprising:
    determining a scaling factor between first and second picture using at least two dimension values of the first and second header information, respectively, and at least one of the at least one offsets; and
    determining at least two input locations for a multi-tap upsampling filter.

19. The method of claim 18, wherein the two or more input locations comprise at least two neighboring locations in the second picture.

20. The method of claim 19, comprising determining at least one unavailable location of the at least two input locations for which the corresponding reference layer sample location is not within the reference layer picture dimensions.

21. The method of claim 20, comprising applying the multi-tap upsampling filter to the two or more input locations to compute the corresponding upsampled sample.

22. The method of claim 21, wherein the computed corresponding reference layer sample value is used for predictively decoding a sample of the enhancement layer picture.

23. A non-transitory computer readable medium comprising a set of executable instructions to direct a processor to:
    decode a first picture of a reference layer including first header information pertaining to the first picture, wherein the first header information comprises dimensions of the first picture;
    decode second header information of a second picture of an enhancement layer or view, wherein the second header information comprises the dimensions of the second picture;
    decode at least one offset indicative of the relative position of at least one sample of the second picture relative to its reference sample position in the first picture;
    determine a sample location in the first picture using at least two of the first picture's dimensions, the second picture's dimensions, and at least one of the at least one offsets;
    identify at least one unavailable sample position in the first picture for which the corresponding sample location for the second picture is not within the first picture's picture dimensions;
    infer at least one property of the sample in the at least one unavailable sample position; and
    decode the second picture utilizing the at least one property of the sample in the at least one unavailable sample position for inter-layer prediction.

24. A system for video decoding, comprising:
    a processor; and
    a non-transitory computer readable medium embodying software that is configured when executed by the processor to:
    decode a first picture of a reference layer including first header information pertaining to the first picture, wherein the first header information comprises dimensions of the first picture;
    decode second header information of a second picture of an enhancement layer or view, wherein the second header information comprises the dimensions of the second picture;
    decode at least one offset indicative of the relative position of at least one sample of the second picture relative to its reference sample position in the first picture;
    determine a sample location in the first picture using at least two of the first picture's dimensions, the second picture's dimensions, and at least one of the at least one offsets;

identify at least one unavailable sample position in the first picture for which the corresponding sample location for the second picture is not within the first picture's picture dimensions;
infer at least one property of the sample in the at least one unavailable sample position; and
decode the second picture utilizing the at least one property of the sample in the at least one unavailable sample position for inter-layer prediction.

\* \* \* \* \*